United States Patent Office 3,763,154
Patented Oct. 2, 1973

3,763,154
CEPHALOSPORANIC ACID DERIVATIVES
Peter Wolfgang Henniger, Leiden, Netherlands, assignor to Kon. Ned. Gist- & Spiritusfabriek N.V., Delft, Netherlands
No Drawing. Filed Dec. 17, 1970, Ser. No. 99,281
Claims priority, application Netherlands, Dec. 18, 1969, 61,842
Int. Cl. C07d 99/24
U.S. Cl. 260—243 C                8 Claims

ABSTRACT OF THE DISCLOSURE

Novel 7-isocyanato-cephalosporanic acid derivatives of the formula

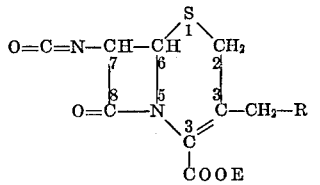

(I)

wherein R is selected from the group consisting of hydrogen, a protected hydroxy group and acyloxy of an organic carboxylic acid of 1 to 18 carbon atoms and E is an easily removable, protective ester group, and the lactone of 7-isocyanato-(desacetyl-)cephalosporanic acid of the formula

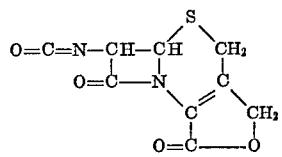

(II)

are extremely useful as starting materials for the preparation by a new process of a great variety of cephalosporanic acid derivatives as the isocyanato group in the 7-position can readily be converted into a substituted amino group and their preparation and to novel cephalosporanic acid derivatives having antibiotic activity.

OBJECTS OF THE INVENTION

It is an object of the invention to provide the novel cephalosporanic acid derivatives of Formulae I and II.

It is a further object of the invention to provide a novel process for the preparation of the cephalosporanic acid derivatives of Formulae I and II.

It is another object of the invention to provide novel 7-amido-cephalosporanic acid compounds and a process for their preparation.

It is an additional object of the invention to provide novel antibiotic compositions and a novel method of combatting bacterial infections in warm-blooded animals.

These and other objects and advantages of the invention will become obvious from the following detailed description.

THE INVENTION

The novel 7-isocyanato-cephalosporanic acid derivatives of the invention are compounds of the formula

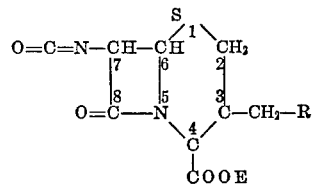

wherein R is selected from the group consisting of hydrogen, a protected hydroxy group and acyloxy of an organic carboxylic acid of 1 to 18 carbon atoms and E is an easily removable, protective ester group and the lactone of 7-isocyanato-(desacetyl-)cephalosporanic acid of the formula

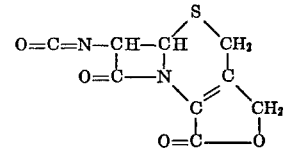

For the compounds of Formula I in which E is an easily removable ester group, the ester group should meet the following conditions:

(a) It should be capable of smooth introduction into the carboxyl group of 7-amino-cephalosporanic acid compounds of the formula

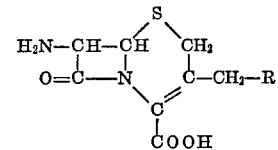

(III)

wherein R is as defined above so that undesired conversions, such as opening of the β-lactam ring of the bicyclic nucleus, do not take place;

(b) It should be easily removable to enable restoration of the carboxylic function without affecting the bicyclic nucleus;

(c) It should give the compound having the group E itself or when dissolved in an inert organic solvent sufficient stability, especially for storage purposes, and (d) It should be unaffected when the isocyanato group of compounds of Formula I is reacted with a number of compounds.

Suitable ester groups for E as defined above are for example:

(1) Silyl groups such as those of the general formula $(R_1)_3Si-$ wherein $R_1$ is a hydrocarbon such as lower alkyl, aryl (preferably phenyl) or aralkyl (preferably phenyl-lower alkyl) group. The term "lower" as applied herein to alkyl groups means that the alkyl group contains at most 6 carbon atoms. It should be observed that silyl esters of Formula I which are easily and smoothly hydrolyzed are preferred and, in particular, the esters in which E is a trialkylsilyl group, and especially the trimethylsilyl group. The silyl ester group can be readily hydrolyzed by addition of alcohols or water by forming the free carboxyl group after first reaction of the isocyanato group to the

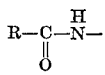

group. Moreover, the silyl group is unaffected when reactions involving the isocyanate function are involved. When using alcohols, an excess of alcohol is preferred.

(2) A phenacyl group optionally substituted on the benzene ring (preferably in the para-position) by halogen, e.g. p-bromophenacyl.

(3) A benzyl or benzhydryl group removable by mild hydrogenation.

According to the invention, 7-isocyanato-cephalosporanic acid derivatives of Formula I, or the lactone compound of Formula II, are prepared by reacting phosgene with a cephalosporanic acid derivative of the general formula

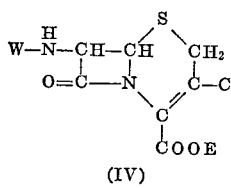 or 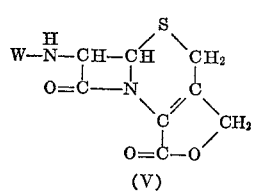

(IV)                                 (V)

wherein W is hydrogen or an easily removable group, for instance a silyl group, and E is as hereinbefore defined in an inert organic solvent to convert the grouping W—NH— into the isocyanato group without affecting the rest of the molecule. Care is required to keep the reaction with phosgene, which may sometimes be violent, under control. An excess of phosgene is preferably used, the excess amount depending on the purity of the cephalosporanic acid derivative starting materials. A smaller excess is required for purer compounds.

The cephalosporanic acid starting materials of Formula IV wherein W is hydrogen or an easily removable group, preferably a silyl group and which is able to react with phosgene, can be prepared by esterification of 7-aminocephalosporanic acid compounds of Formula III with an alcohol of the formula E—OH or a compound of the formula E—Hal, wherein Hal represents a halogen, preferably chlorine and E is as hereinbefore defined, e.g. a trialkylhalosilane. The reaction is preferably carried out in an inert organic solvent medium and in the presence of an acid-binding agent. Solvents such as aromatic hydrocarbons, especially toluene, and dichloromethane are very well suited and as acid-binding agent an organic base, such as a tertiary amine, e.g. triethylamine, is preferably used. The cephalosporanic acid starting material of Formula V wherein W represents a hydrogen atom can be prepared by known methods.

The group W in the starting materials of Formula IV may be introduced on the amino group of 7-aminocephalosporanic acid derivatives of Formula III concurrently with the esterification of the carboxyl group, or afterwards. Preferably, the group W is a silyl group of the formula $(R_1)_3Si$—, wherein $R_1$ is as hereinbefore defined, and such a group, for example a tri(lower) alkylsilyl (preferably trimethylsilyl) group, is advantageously introduced into the 7-aminocephalosporanic acid compound concurrently with the esterification step, the reaction conditions being so selected to achieve that and so give a cephalosporanic compound of Formula IV in which E and W both represent the same group. When W in the starting material of Formula IV is an easily removable group as trialkylsilyl, the reaction of such compounds with phosgene proceeds much more smoothly under the same reaction conditions than is the case when W represents a hydrogen atom. When, for example, a trialkylhalosilane is employed as the esterifying agent and R in the 7-aminocephalosporanic acid reactant of Formula III is a hydroxy group, the hydroxymethyl substituent in the 3-position may also be silylated, for example when an excess of the silane reactant is employed.

Compounds of Formula V wherein W is an easily removable group, preferably a trialkylsilyl group, can similarly be prepared from the compounds of Formula V wherein W represents hydrogen, by reaction with suitable reagents, for instance such of the type trialkylsilylhalide as hereinbefore defined.

In an alternative method for obtaining 7-isocyanato-cephalosporanic acid compounds of Formula I wherein E is phenacyl, benzyl or benzhydryl, 7 - amino - cephalosporanic acid derivatives of Formula III can be reacted with a phenacyl halide to give a phenacyl ester of the acid, or reacted with phenyldiazomethane or diphenyldiazomethane to give the benzyl and benzhydryl esters of the acid respectively, and hereafter with phosgene under conditions mentioned earlier.

In the process of the invention for the preparation of esters of 7-isocyanatocephalosporanic acid derivatives of Formula I, or the lactone compound of Formula II, special attention should be paid to the reaction conditions in view of both the sensitivity of the bicyclic nucleus towards various influences (e.g. acidic or alkaline medium, and high temperature) and the reactivity of the resulting isocyanato group. Therefore, the reaction with phosgene is carried out in a dry, inert organic solvent medium.

For this purpose, dichloromethane, toluene or tetrahydrofuran or mixtures thereof (preferably dichloromethane and toluene) are particularly suitable.

The currently used methods for the preparation of isocyanates use elevated temperatures to accomplish the formation of the isocyanato group —N=C=O. But, such procedures are unsuitable in the process of the invention as they could well lead to decomposition of the cephalosporanic acid molecule. It has, however, been found that the esters of 7-aminocephalosporanic acid derivatives of Formula IV especially those in which E and W represent trialkylsilyl groups, or compounds of Formula V, can be converted into the corresponding 7-isocyanatocephalosporanic acid compounds by reaction with phosgene at low temperatures below —20° C. and preferably —40° C. are used with advantage. Destruction of the bicyclic nucleus is thereby completely or virtually completely prevented. In order to bind the hydrogen chloride formed in the reaction with phosgene, it is preferred to carry out the reaction in the presence of an acid-binding agent, preferably an organic base such as a tertiary amine and one which forms a substantially insoluble hydrochloride in the solvent employed so that the amine hydrochloride may be removed by filtration from the reaction mixture at low temperatures, e.g. at about —40° C. in order to avoid undesired conversions of the cephalosporanic compound formed. Rather low-boiling tertiary aliphatic amines are especially preferred as acid-binding agents. When silyl esters of Formula IV are reacted with phosgene, triethylamine is particularly suitable as the acid-binding agent. Aromatic tertiary amines are less satisfactory due to their lower basicity.

From the 7-isocyanato-cephalosporanic acid esters of Formula I, and the compound of Formula II, a great variety of cephalosporanic acid derivatives can be prepared using the well-known reactivity of the isocyanato group. This group can, for example, enter into reaction with alcohols, thiols, carboxylic acids, amines, water, organo-metal compounds such as Grignard reagents, and organo-lithium compounds.

Thus, according to another feature of the invention, 7-substituted-amino-cephalosporanic acid derivatives are prepared by a new process which comprises converting the isocyanato radical of a 7-isocyanato-cephalosporanic acid ester of Formula I, or 7-isocyanato-cephalosporanic acid desacetyl lactone of Formula II, into a substituted amino group by methods known per se which do not affect the rest of the molecule, and optionally removing the group E by methods known per se from an ester of a 7-substituted-aminocephalosporanic acid derivatives so produced and, if desired, converting the resulting acid into a salt, e.g. alkali metal, alkaline earth metal or amine salt, thereof. By the term "methods known per se" is meant methods heretobefore used or described in the chemical literature.

Among the cephalosporins that can be obtained according to the invention those of the general formulae:

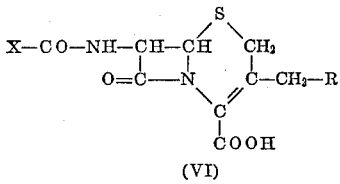
(VI)

or

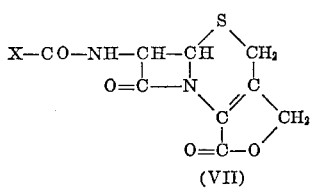
(VII)

are of special interest. In these formulae, the symbol X may be a group

(VIII)

wherein $R_2$ is an optionally substituted hydrocarbon, for example, (1) an alkyl group, (2) an aryl group, such as phenyl, or a halophenyl, alkoxyphenyl, naphthyl or alkoxynaphthyl group, or (3) an aralkyl group such as the benzyl group, or a phenoxy group, $R_3$ is hydrogen or halogen, cyano, $NH_2$— or —NH—COOY, —OY, or COOY, or

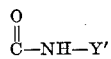

in which Y is lower alkyl or aryl (preferably benzyl or phenyl group) and in which Y' is alkyl, aryl or sulfonyl-Y and $R_4$ is hydrogen or lower alkyl.

Examples of such groups $R_2R_3R_4C$— are

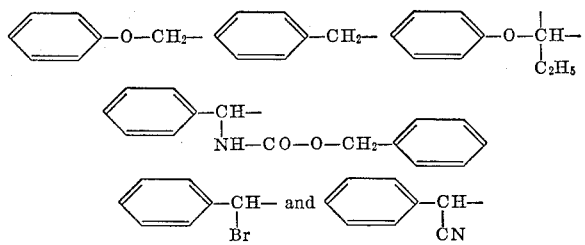

The conversion of the isocyanato radical of a 7-isocyanato-cephalosporanic acid ester of Formula I, or the lactone compound of Formula II into a group

X—CO—NH— can be carried out by reacting the ester or the lactone compound with an acid X—CO—OH, wherein X is as hereinbefore defined. The reaction is preferably carried out in an inert organic solvent medium such as toluene and a small amount of an organic base, for example pyridine, may serve as catalyst. The reaction proceeds when an ester of Formula I is employed according to the scheme:

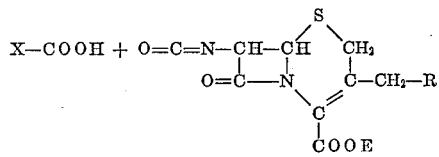

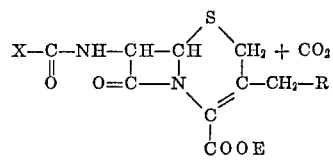

whereafter the esterifying group E is removed from the intermediate ester product preferably by hydrolysis. The acid reactant may be, for example, phenoxyacetic, α-phenoxybutyric phenylacetic, α-bromophenylacetic or α-cyanophenylacetic acid, or α-phenyl-N-benzyloxycarbonyl-glycine.

Alternatively, conversion of the isocyanato radical of a 7-isocyanato-cephalosporanic acid ester of Formula I or lactone compound of Formula II, into a group

X—CO—NH— can be carried out by reacting the ester or lactone with an organo-metal compound of the formula A—ME$^I$, A—ME$^{II}$—Hal or A—Me$^{II}$—A, wherein Me is a metal atom the numeral I or II indicating its valence, Hal is a halogen atom, and wherein the group A represents the earlier defined group X, except those having substituents which can react with the active metal atom, or an optionally substituted aryl nucleus (preferably phenyl or naphthyl, for instance substituted with a lower alkyl, a lower alkoxy) directly attached to the metal atom. Preferably A represents an aryl group (e.g. phenyl, 1- or 2-naphthyl, biphenyl)optionally substituted with a lower alkoxy, aryloxy, lower alkyl or aralkyl group; a benzyl group or a naphthyl-methyl group, optionally α-substituted with halogen, C≡N, $CO_2Y$, OY group, wherein Y represents an alkyl, aryl or can be replaced by hydrogen after the reaction.

The reaction is carried out in an anhydrous organic solvent medium under conditions favoring a reaction of the Grignard, Reformatzky or analogous type. The organometal reactant may be derived from, for example 1-bromo - 2 - ethoxynaphthalene, bromobenzene, 4-methoxy-phenyl-bromide, α-bromophenylacetic acid or salts or esters thereof, phenylacetic acid or salts or esters thereof, or benzyl cyanide. Several metal-organic compounds may be used, such as compounds having a C—Li, C—Na or C—Mg bond.

Especially for the preparation of 7-arylcarbonamidocephalosporanic acids derivatives from isocyanates of the invention and aryl-Grignard compounds, the following method gives good results. The method consists in the addition of an isocyanate of the invention dissolved in a suitable solvent (preferably toluene) to a very cold solution of the aryl Grignard reagent in a solvent such as tetrahydrofuran, diglyme (2,2'-dimethoxy-diethyl-ether) or 1,2-dimethoxyethane, and a predetermined amount of a highly dipolar aprotic solvent, such as tetramethylurea. N-methypyrrolidone or, especially hexamethylphosphontriamide may be added. Surprisingly, the selectivity of the method is so high that any alkyl ester group present, e.g. the acetoxy group in the cephalosporanic skeleton, is substantially not decomposed. The method may also be applied to several substituted or unsubstituted hetero-aryl-Grignard compounds, especially when they may easily be prepared in a solvent such as tetrahydrofuran.

Generally, an excess of the Grignard reagent is used for the reaction with an isocyanate of the invention, and the extent of the excess is dependent on the particular reaction, for example with 2-ethoxynaphthaleno-1-magnesium bromide, good results are obtained with an excess of about 100% of the Grignard reagent, whereas for phenylmagnesium bromide and 4-methoxyphenylmagnesium bromide, only a small excess of the Grignard reagent is necessary.

Other cephalosporanic acid derivatives of Formula VI, or VII obtainable from the 7-isocyanatocephalosporanic acid esters of Formula I or the lactone compound of Formula II, by reaction with an amine or amide, are those wherein X is a group

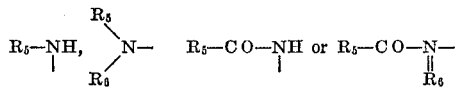

wherein $R_5$ is lower alkyl, isocyclic having not more than 8 carbon atoms, aryl, especially phenyl or naphthyl, which may carry one or more substituents selected from alkoxy, hydroxy, halogen and carboxy groups, or a group of the formula

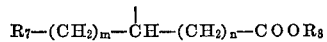

in which $R_7$ is hydrogen or aryl (preferably phenyl) $n$ and $m$ each represent zero or an integer from 1 to 4 and $R_8$ is hydrogen or lower alkyl or a cephalosporanyl or a penicillanyl group, and $R_6$ is lower alkyl or alternatively $R_5$ and $R_6$ together with nitrogen atom to which they are attached form a heterocyclic nucleus, for example, a benzimidazolyl or piperidyl nucleus.

With amide reagents, an activation by means of a metal, such as Na or Li, is normally necessary in order to obtain a sufficient reaction rate. The reaction is preferably carried out in an inert organic solvent medium, for example dichloromethane or toluene, under anhydrous conditions advantageously in the presence of a catalytic amount of an organic base such as pyridine. The products resulting from the reaction and after de-esterification, e.g. by hydrolysis, are ureido-cephalosporanic acid derivatives when an amine is used as reactant or acylureido-cephalosporanic acid derivatives, when the reactant is an acid amide. Suitable reactants that may be used are 1- or 2-naphthylamine, aniline, N-methylaniline, o-methoxyaniline, p-aminosalicylic acid, anthranilic acid, D-phenylglycine, ethyl glycinate, butylamino, cyclohexylamine, 7-aminocephalosporanic acid and esters thereof, and benzimidazole.

Other types of cephalosporanic acid derivatives of Formula VI or VII obtainable from the 7-isocyanato-cephalosporanic acid esters of Formula I, or the lactone compound of Formula II, by reaction with hydroxylic reactants, are those wherein X represents a group Y—O— in which Y is optionally substituted hydrocarbon such as an alkyl, aryl, halo-substituted aryl, or aralkyl group. Representative of suitable hydroxylic reactants Y—OH that can be used are, for example, benzyl alcohol, ethanol, phenol, p-methoxyphenol and p-bromophenol. The products obtained belong to the class of 7-cephalosporanyl-urethanes. The reaction can be carried out without employment of a solvent in those cases where the reactant Y—OH has itself good solvent properties for the isocyanato-cephalosporanic acid ester or lactone compound of Formula II. When Y—OH is a phenol, an inert, anhydrous organic solvent, e.g. toluene, is preferably used. The reaction may be facilitated by the addition of a catalyst such as a dialkylstannidiacetate. The cephalosporins obtained from the 7-isocyanato-cephalosporanic acid esters of Formula I may be isolated as such from the reaction mixture in which they are formed or in the form of a salt, e.g. sodium, potassium, calcium, cyclohexylamine or N-ethylpiperidine salt.

Novel cephalosporanic acid derivatives of Formulae VI and VII have antibiotic properties which make them useful as medicines for men and animals and as additives in animal feed. The compounds of Formula VI are preferably employed for therapeutic purposes in the form of a non-toxic salt such as the sodium, potassium or calcium salt. Other salts that may be used in pharmaceutical preparations include the nontoxic, suitably crystalline salts with organic bases such as amines, for example trialkylamines, cyclohexylamine, procaine, dibenzyl-amine and N-alkylpiperidines.

When used for therapeutic purposes, the novel cephalosporins conforming to Formula VI or VII, or non-toxic salts thereof, may be used as such or in the form of a pharmaceutical preparation customarily employed for the administration of therapeutically active substances, especially antibiotics. The invention includes within its scope pharmaceutical preparations comprising, as the active ingredient, one of the novel cephalosporins of the invention in association with a pharmaceutically acceptable carrier, which may be solid or liquid. The cephalosporins as such, or in admixture with a solid or liquid diluent, may be included in capsules made of absorbable material, such as gelatin. The cephalosporins may be attached to or incorporated in a carrier substance in such a way that the active substance is released over an extended period of time after ingestion. Liquor preparations may be in the form of solutions suitable for parenteral administration. The usual individual dosage is 100 to 2000 mg.

The novel method of combatting bacterial infections in warm-blooded animals comprises administering an effective amount of a cephalosporin of Formula VI or VII or salts thereof. The compounds may be administered orally, parenterally or rectally. The usual daily dose is 5 to 100 mg./kg., depending upon the method of administration and the specific compound. The compounds have been shown to be effective against gram negative bacteria such as *Brucella melitensis* A488, *Pasteurella multocida* A723 and *Klebsiella pneumoniae* A809. Gram positive such as *Bacillus subtilis* 6633, *Staphylococcus aureus* A55, A321, A355 and L160[a], *Streptococcus haemolyticus* A266 and *Diplococcus pneumoniae* L54.

In the following examples there are described several preferred embodiments to illustrate the invention. However, it should be understood that the invention is not intended to be limited to the specific embodiments.

EXAMPLE I

Preparation of the trimethylsilyl ester of 7-isocyanato-cephalosporanic acid

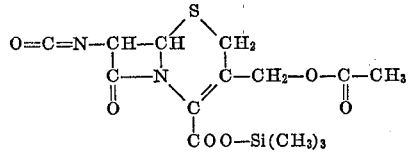

70 ml. of dichloromethane and 5.54 g. (20.35 mmol) of 7-aminocephalosporanic acid having a purity of about 90 to 95% were placed in a 250 ml. three-necked vessel provided with a stirrer, a dropping funnel, a $P_2O_5$-tube and a gas inlet tube, through which nitrogen was introduced. The suspension was cooled to 0° C., and 7.3 ml. (52.4 mmol) of triethylamine were added. 7.2 ml. (57 mmol) of trimethylchlorosilane were then added dropwise to the stirred and externally cooled suspension at a rate such that the reaction temperature was maintained at about 0° C. (duration about 5 minutes). The reaction mixture was stirred for 30 minutes at 0° C. and then for 30 minutes without cooling during which the temperature gradually rose to about 20° C.

45 ml. of toluene were added and the reaction mixture was cooled to −65° C. with external cooling and then 2.7 ml. (19.4 mmol) of triethylamine and 2.9 ml. (about 46 mmol) of liquid phosgene, cooled to about −70° C., were added, which caused the temperature of the reaction mixture to rise to about −50° C. The mixture was stirred for 4 hours at −50° C. and the precipitate which formed, was filtered off in about 3 minutes under a nitrogen atmosphere at −40° C., and washed twice with 30 ml. of pre-cooled toluene. The filtrate and the washings were combined and evaporated in vacuo at a pressure between about 0.5 and 1.5 mm./Hg absolute so that dichloromethane, the excess phosgene, trimethylchlorosilane and triethylamine residues were removed. During the evaporation, the temperature, which was −45° C. at the beginning, rose slowly to ambient temperature and the final volume of the isocyanate dissolved in toluene was 46 ml.

The slightly colored solution was stored several days at −3° C., and another small amount of precipitate was formed, which originated from impurities present in the 7-aminocephalosporanic acid starting material. The concentration of the trimethyl silylester of 7-isocyanatocephalosporanic acid in the solution was estimated by the PMR spectrum by adding 1 ml. of the solution to a weighed amount of anhydrous and purified methyl benzoate. The concentration was 0.361 mmol/ml. so that the yield was 16.61 ml. or 82±5% of the final compound.

Partial analysis of the IR spectrum of the final product dissolved in toluene (concentrated about 10 mg./ml. values in cm.$^{-1}$):

N=C=O ———————————————————— 2268
C=O β-lactam ———————————————— 1785
C=O acetoxy ———————————————— 1746
C=O silyl ester ———————————————— 1709
Si(CH$_3$)$_3$ ———————————————————— 1250
C—O—C acetyl ester —————————————— 1220
Si(CH$_3$)$_3$ ———————————————————— 849

Analysis of PMR spectra of the final product (60 mc., δ-values in p.p.m., tetramethylsilane as internal standard):

| | Dissolved in toluene [1] | Dissolved in CDCl$_3$ [2] |
|---|---|---|
| Si(CH$_3$)$_3$ | 0.35 | 0.37. |
| O=C=CH$_3$ | 1.74 | 2.09. |
| S—CH$_2$ | 2.67, 2.98, 3.04, 3.35, AB-quadruplet, J=18.3±0.3 cps. | About 3.53, about 3.56 AB-quadruplet, with very weak outside lines. |
| C$_6$—H+C$_7$—H | 4.06, 4.14, 4.29, 4.38, AB-quadruplet, J=5.0±0.2 cps. | 4.90, 4.99, 5.17, 5.25, AB-quadruplet, J=5.0±0.2 cps. |
| O—CH$_2$ | 4.52, 4.75, 5.10, 5.33, AB-quadruplet, J=13.7±0.2 cps. | 4.76, 4.99, 5.10, 5.33, AB-quadruplet, J=13.7±0.2 cps. |

[1] Solution in 1 ml. of toluene plus 0.363 mmol of methyl benzoate, concentration: 0.361 mmol/ml.
[2] Concentration about 0.4 mmol/ml.; the solution was obtained by evaporating a toluene solution as far as possible and dissolving the partially crystallized residue in CDCl$_3$ and therefore, a small amount of toluene was present in the solution.

EXAMPLE II

Preparation of the trimethylsilyl ester of 7-isocyanatodesacetoxycephalosporanic acid

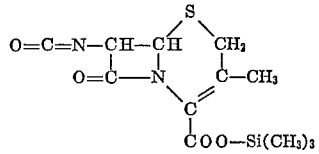

Using the procedure of Example I, 5.7 g. of 7-aminodesacetoxycephalosporanic acid having a purity of about 90% was converted into the trimethylsilyl ester of 7-isocyanatodesacetoxycephalosporanic acid. The amounts of reactants used were: 94 ml. of dichloromethane; 9.8 ml. of triethylamine; 9.6 ml. of trimethylchlorosilane; 47 ml. of toluene; 3.6 ml. of triethylamine; 3.9 ml. of phosgene and, finally, about 60 ml. of toluene. The volume of the final solution was about 43 ml. The solution contained 0.464 mmol/ml. of the said compound for a yield: 19.95 mmol or 75±5%.

Partial analysis of the IR spectrum of the final product dissolved in toluene (concentration about 10 mg./ml.; values in cm.$^{-1}$):

N=C=O ———————————————————— 2265
C=O β-lactam ———————————————— 1778
C=O silyl ester ———————————————— 1706
Si(CH$_3$)$_3$ ———————————————————— 1245, 845

Analysis of the PMR spectrum of a solution of 0.464 mmol of the final product in 1 ml. of toluene+0.73 mmol of methyl benzoate (for determination of the concentration) (60 mc., internal standard: tetramethylsilane, δ-values in p.p.m.):

Si(CH$_3$)$_3$ ———————— 0.36.
CH$_3$ ———————————— 1.87.
S—CH$_2$ ———————————— About 2.37, 2.68, 2.78 about 3.08, AB-quadruplet, J=18±1 cps.
C$_6$—H+C$_7$—H ——— 4.18, 4.27, 4.34, 4.42, AB-quadruplet, J=5.0±0.2 cps.

EXAMPLE III

Preparation of the disodium salt of 1,3-bis-(7-cephalosporanic acid)-urea

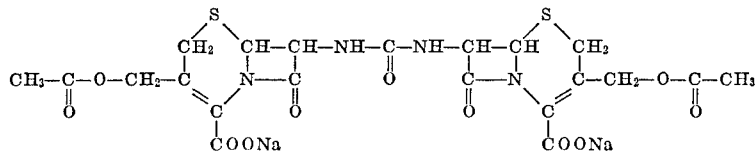

A small amount of a solution of the trimethylsilyl ester of 7-isocyanatocephalosporanic acid was added to vigorously stirred ice-water and a solid precipitate was formed. After stirring a few minutes, the pH of the suspension was adjusted to 6.0 by addition of dilute sodium hydroxide and a small amount of diethyl ether was added to the mixture, and the layers formed were separated. The aqueous layer was extracted twice with diethyl ether, and ethyl acetate was added thereto. By adding dilute hydrochloric acid to the stirred mixture, the pH was adjusted to 1.5 and the ethyl acetate layer was separated, and was washed twice with a small amount of ice-water. The ethyl acetate layer was concentrated in vacuo and a solution of sodium ethyl capronate in propanol was added to the stirred mixture to obtain a pH of about 7.0. A precipitate was formed which was filtered off, washed with ethyl acetate and acetone, and dried in vacuo to obtain about a 40% yield of the disodium salt of 1,3-bis-(7-cephalosporanic acid)urea which has antibiotic activity.

Partial analysis of the IR spectrum (KBr-disk, values in cm.$^{-1}$):

N—H ———————————————————— 3310
C=O β-lactam ———————————————— 1760
C=O ester ———————————————————— 1739
C=O amide ———————————————————— About 1635
C=O carboxylate ion ——————————— About 1615
C—O—C ester ————————————————— 1235

Analysis of the PMR spectrum of the final product, dissolved in D$_2$O (60 mc., δ-values in the p.p.m., internal standard; 2,2-dimethyl-2-silapentane-5-sulphonate):

CH$_3$ ———————— 2.11.
S—CH$_2$ ———————— 3.50, 3.60 (central absorptions of AB-quadruplet).
O—CH$_2$ ———————— 4.82, 4.86 (central absorptions of AB-quadruplet)
C$_6$—H+C$_7$—H ——— 5.10, 5.18, 5.57, 5.65 (AB-quadruplet, J=4.7±0.2 cps.).

EXAMPLE IV

Preparation of 7-(benzyloxycarbonamido)-cephalosporanic acid

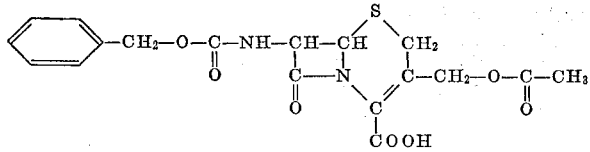

A drop of pyridine and 2 ml. of fresh distilled benzyl alcohol were added to a stirred solution of 2 mmol of the trimethylsilyl ester of 7-isocyanato-cephalosporanic acid in 12 ml. of toluene while bubbling nitrogen through the solution and the reaction mixture was then stirred for 1 hour at room temperature. A thin-layer chromatographic test showed that the said ester was converted completely into one single compound containing sulphur. On standing, a crystalline precipitate was gradually formed in the reaction mixture and after two hours at 0° C., the precipitate was filtered off, washed with toluene and dried in vacuo to obtain 450 mg. (55% yield) of 7-(benzyloxycarbonamido)-cephalosporanic acid. Thin-layer chromatography and PMR spectrum test showed that the product was pure and the configuration was confirmed by the PMR spectrum. A further quantity of the product was recovered by evaporation of the mother liquor, dissolving the slightly colored oil formed in acetone, and adding just enough diethyl ether to start crystallization.

Analysis of the PMR-spectrum of the final product dissolved in $D_2O$ with the addition of sodium bicarbonate (60 mc., δ-values in p.p.m., internal standard: 2,2-dimethyl-2-silapentane-5-sulphonate):

$CH_3$ -------------- 2.11 (3 protons).
S—$CH_2$ ---------- About 3.14, 3.44, 3.55, about 3.84 (AB-quadruplet, J=18±1 cps.) (2 protons).
O—$CH_2$ --------- 4.93, 4.95 (central lines of AB-quadruplet, 2 protons).
$C_6H_5$—$CH_2$ ------ 5.19 (2 protons).
$C_6$—H+$C_7$—H --- 5.09, about 5.19, 5.58, 5.65 (AB-quadruplet, J=4.5±0.2 cps., 2 protons).
$C_6H_5$ ------------ 7.6 (5 protons).

EXAMPLE V

Preparation of the N-ethylpiperidine salt of 7-(N'-phenylureido)-cephalosporanic acid

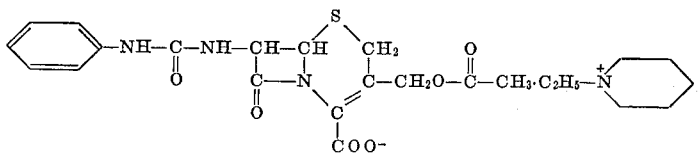

A solution of 0.87 mmol of the trimethylsilyl ester of 7-isocyanatocephalosporanic acid in 5 ml. of toluene was added dropwise over a period of 10 minutes to a magnetically stirred solution of 90 mg. (0.97 mmol) of freshly distilled aniline in 5 ml. of dichloromethane at room temperature under a nitrogen atmosphere and a precipitate was formed spontaneously. The rection mixture was stirred for 30 minutes at room temperature and a calculated amount of absolute ethyl alcohol was added to decompose the silyl ester. The reaction mixture was evaporated in vacuo and the residue was dissolved in 5 ml. of anhydrous, purified ethyl acetate. The solvent was evaporated off in vacuo and 20 ml. of ethyl acetate were added to the residue. 97 mg. (1 equivalent) of N-ethylpiperidine were added to the stirred solution and a colorless precipitate was formed spontaneously which after stirring the mixture for a few moments at 0° C. was filtered off, washed twice with ethyl acetate and four times with diethyl ether and dried in vacuo to obtain 296 mg. (64% yield) of the N-ethylpiperidine salt of 7-(N'-phenylureido)-cephalosporanic acid.

The structure of the final product was confirmed by the IR and PMR spectra. A small amount of N-ethylpiperidine was present in the final product.

Partial analysis of the IR spectrum of the final product in KBr and in $CHCl_3$, concentration about 10 mg./ml. (values in cm.$^{-1}$):

| In KBr | In $CHCl_3$ | |
|---|---|---|
| About 3,300 | {About 3335 3210} | NH. |
| About 2,675 | | |
| About 2,530 | About 2,640 | NH+. |
| About 1,783 | 1,780 | C=O β-lactum. |
| 1,734 | 1,735 | C=O ester. |
| 1,695 | 1,691 | C=O ureido. |
| 1,610 | 1,605 | C-O carboxylate ion. |
| 1,599 | | C=C aromatic nucleus. |
| 1,550 | 1,550 | NH def. |
| 1,498 | 1,498 | C=C aromatic nucleus. |
| 1,222 | | C—O—C ester. |
| 752 | | Aromatic substituent. |
| 690 | | |

EXAMPLE VI

Preparation of the N-ethylpiperidine salt of 7-(N'-cyclohexylureido)-cephalosporanic acid

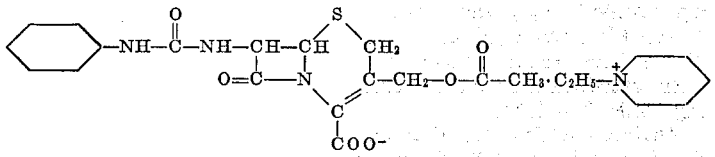

Using the method of Example V, a solution of the trimethylsilyl ester of 7-isocyanato-cephalosporanic acid in toluene was added dropwise to a solution of cyclohexylamine in dichloromethane. The N-ethylpiperidine of 7-(N'-cyclohexylureido)-cephalosporanic acid finally obtained was pure according to a thin-layer chromatographic test. The structure of the final product was confirmed by IR and PMR spectra, which revealed that it contained a small amount of diethyl ether and N-ethylpiperidine as impurities.

Partial analysis of the IR spectra of the final product in a KBr-disk and dissolved in chloroform, concentration about 10 mg./ml. (values in cm.$^{-1}$):

| In KBr | In $CHCl_3$ | |
|---|---|---|
| About 3,340 | {About 3,440 About 3,375} | NH. |
| 1,770 | 1,773 | C=O β-lactam. |
| About 1,735 | 1,733 | C=O ester. |
| About 1,675 | 1,675 | C=O ureido. |
| 1,605 | 1,601 | C=O carboxylate ion. |
| About 1,550 | 1,548 | NH def. |
| About 1,224 | | C—O—C ester. |

EXAMPLE VII

Preparation of the sodium salt of 7-(2-ethoxynaphthyl) carbonamido-cephalosporanic acid

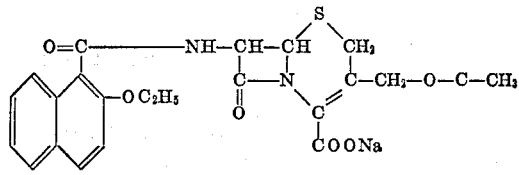

0.49 g. (20 mmol) of magnesium turnings were added to a solution of 4.38 g. (17.5 mmol) of 1-bromo-2-ethoxynaphthalene in 17.5 ml. of anhydrous tetrahydrofuran. On gentle heating, the reaction started spontaneously whereafter the stirred mixture was refluxed 30 minutes while nitrogen was passed over the mixture. The reaction mixture was cooled to about 10° C. and 6.2 ml. of hexamethylphosphontriamide was added. The mixture was further cooled to −60° C. and a solution of 8.71 mmol of the trimethylsilyl ester of 7-isocyanatocephalosporanic acid in 24 ml. of toluene was added dropwise to the stirred mixture (Grignard reagent) at a rate such that the temperature of the reaction mixture did not exceed −40° C. while nitrogen was passed over the reaction mixture. The reaction mixture was stirred for another 30 minutes at −40° C. and was then poured into a stirred mixture of 155 ml. of ice-water and 45 ml. of ethyl acetate while the pH was maintained at about 2.5 by the simultaneous addition of 1 N HCl. After the pH of the mixture had remained constant for a few moments, the pH was adjusted to 7 with dilute NaOH. The precipitate was filtered off and the organic layer was separated from the aqueous layer and was washed twice with 20 ml. of ice-water. The aqueous layer was combined with the wash waters and 45 ml. of ethyl acetate were added to the stirring mixture and the pH was adjusted to 3.5 with 1 N HCl. The layers were separated and the aqueous layer was extracted with 45 ml. of ethyl acetate. A thin-layer chromatographic test of the combined ethyl acetate layers showed that they contained a further amount of the same compound as the precipitate referred to above. This solid was admixed with a cold mixture of 45 ml. of ethyl acetate and 50 ml. of water, and sufficient 1 N HCl was added to bring the pH to 3.5. The layers were separated and the aqueous layer was extracted with a small amount of ethyl acetate. The combined ethyl acetate solution was washed twice with 20 ml. of ice-water, treated with a small amount of decolorizing charcoal and concentrated in vacuo to a volume of about 50 ml. A solution of 8.2 mmol of sodium α-ethylcapronate in 14 ml. of propanol was added to the residue and the precipitate formed was filtered off, washed with ethyl acetate and diethyl ether and dried at ambient temperature to obtain 3.3 g. of the sodium salt of 7-(2-ethoxynaphthyl) carbonamido-cephalosporanic acid. The mother liquor contained a further small amount of the final product.

Thin-layer chromatographic tests showed that the solid consisted of one single compound containing sulphur. IR and PMR spectra confirmed the configuration of the compound, and the purity of the final product was about 90%.

Partial analysis of the IR spectrum of the final product (KBr-disk, values in cm.$^{-1}$):

| | |
|---|---|
| NH | About 3275 |
| =C—H | About 3050 |
| C=O β-lactam | 1760 |
| C=O ester | 1735 |
| C=O amide | 1650 |
| C=O carboxylate ion | 1625 |
| C=C aromatic nucleus | 1598 |
| NH def. | 1510–1530 |
| $CH_3$ acetoxy | 1369 |
| C—O—C ester | 1238 |

Similar reactions were carried out starting from the trimethylsilyl ester of 7-isocyanatocephalosporanic acid and phenylmagnesium bromide, and 4-methoxyphenylmagnesium bromide, resulting in 7 benzamidocephalosporanic acid and 7-(4-methoxybenzamido)cephalosporanic acid, respectively, having the following formulae:

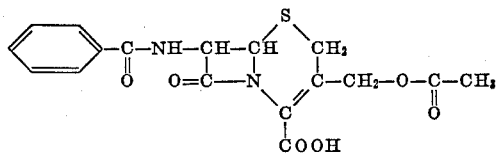

and

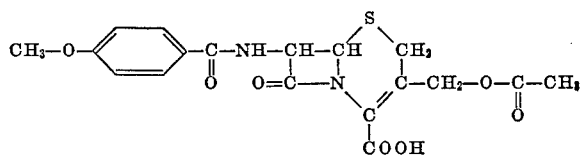

EXAMPLE VIII

Preparation of the sodium salt of 7-(α-cyanophenyl-acetamido)-cephalosporanic acid

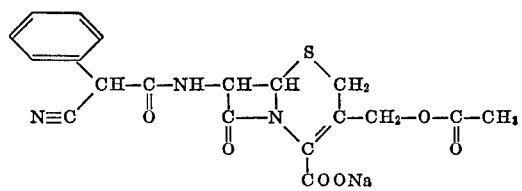

A solution of 3 mmol of the trimethylsilyl ester of 7-isocyanatocephalosporanic acid in 18 ml. of toluene was added at ambient temperature under a nitrogen atmosphere to a stirred solution of 483 mg. (3 mmol) of α-cyanophenylacetic acid in 18 ml. of anhydrous purified dichloromethane in the presence of a small amount of pyridine. After 90 minutes, the reaction mixture was cooled and diluted with cold aqueous acetone and poured into 100 ml. of ice-water and neutralized with dilute NaOH. The aqueous layer was separated and the organic layer was washed once with ice water. 30 ml. of ethyl acetate were added to the combined aqueous layers, and the pH adjusted to 3 within 1 N HCl. The organic layer was separated, and the aqueous layer was extracted with 30 ml. of ethyl acetate. The combined ethyl acetate layers were washed with a small amount of ice-water, dried over anhydrous sodium sulphate and filtered. A solution of 498 mg. (3 mmol) of sodium α-ethylcapronate in 5 ml. of ethyl acetate was added to the filtrate whereby a crystalline precipitate was formed. The mixture was allowed to stand for 2 hours at 0° C. and the precipitate was filtered off, washed with cold ethyl acetate and diethyl ether, and dried in vacuo to obtain the sodium salt of 7-(α-cyanophenylacetamido)-cephalosporanic acid. A thin-layer chromatographic test showed a single spot (determination of sulphur containing compounds). The proposed structure was confirmed by IR and PMR spectra of the compound.

Partial analysis of the IR spectrum of the final product (KBr-disk values in cm.$^{-1}$):

| | |
|---|---|
| NH | 3300 |
| C≡N | 2255 |
| C=O β-lactam | About 1750 |
| C=O ester | 1735 (shoulder) |
| C=O amide | 1667 |
| C=O carboxylate ion | About 1620 |
| NH def. | 1540 |
| C—O—C ester | 1225 |

Analysis of the PMR spectrum of the final product dissolved in D₂O (60 mc., δ-values in p.p.m., internal standard: 2,2-dimethyl-2-silapentane-5-sulphonate):

| | |
|---|---|
| CH₃ | 2.09; 2.13 (3 protons). |
| S—CH₂ | 3.25→3.5 (central part; irregular triplet, 1.5 protons). |
| H₂O+OCH₂+C₆—H+Cα—H | 4.5→5.3. |
| C₇—H | 5.52; 5.60, 5.68, 5.76 (2 doublets, J≈4.7 cps. 1 proton). |
| C₆H₅ | 7.2→7.8. |

EXAMPLE IX

Preparation of the potassium salt of 7-(phenoxymethylcarbonamido)-cephalosporanic acid

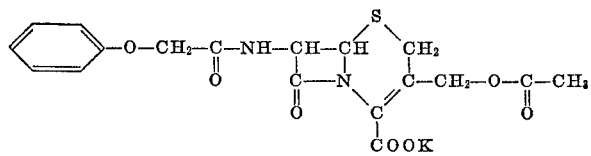

Using the procedure of Example VIII, the trimethylsilyl ester of 7-isocyanatocephalosporanic acid was reacted with an equivalent amount of phenoxyacetic acid in a mixture of toluene and dichloromethane in the presence of pyridine. Carbon dioxide was produced, and its production was finished after about 5 hours to obtain trimethylsilyl ester of 7-(phenoxymethylcarbonamido)-cephalosporanic acid which was converted into the potassium salt and the salt isolated. Thin-layer chromatographic, IR and PMR spectrum tests showed that the product was identical to the product obtained from 7-aminocephalosporanic acid and phenoxyacetyl chloride.

EXAMPLE X

Preparation of the sodium salt of 7-[α(N-p-tolylsulphonylcarbamoyl) - benzylcarbonamido] - desacetoxycephalosporanic acid and 1,3-bis-(N - 7 - desacetoxycephalosporanic acid)-urea

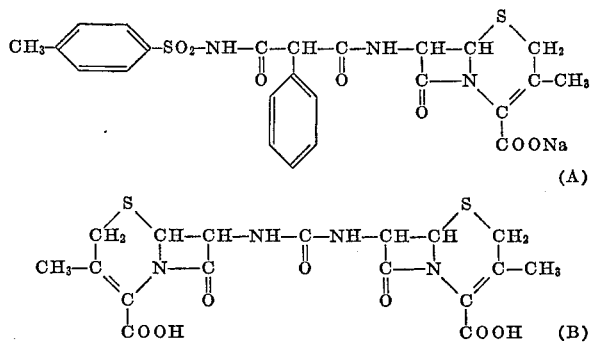

Using the procedure of Examples VII and VIII, the compound of Formula A of this example was prepared and the compound of Formula B was obtained as a by-product. The IR and PMR spectra of both above-mentioned compounds were investigated, and are given below:

Partial analysis of the IR spectrum of product (A) (KBr-disk, δ-values in cm.⁻¹):

| | |
|---|---|
| NH | 3430 |
| =C—H | 3065, 3033 |
| C=O β-lactam | 1750 |
| C=O amide | About 1650 (shoulder) |
| C=C carboxylate ion+C=C aromatic nucleus+probably C=O amide | About 1600 |
| C=C aromatic nucleus | 1493 |
| Probably SO₂ | 1350, 1135 |
| Aromatic substituent | 692, 660 |

Partial analysis of the PMR spectrum of product (A) (60 mc., D₂O solution, δ-values in p.p.m., internal reference: 2,2-dimethyl-2-silapentane-5-sulphonate):

| | |
|---|---|
| C₃—CH₃ | 1.77. |
| p-Tolyl—CH₃ | 2.32. |
| S—CH₂ | About 3.25 (centre of AB-quadruplet). |
| Cα—H | 4.61, 4.66. |
| C₆—H | About 5.03 (centre of doublet). |
| C₇—H | About 5.63 (centre of doublet). |
| C₆H₅ | About 7.37. |
| C₆H₄ | 7.0→7.9 (multiplet). |

Partial analysis of the IR spectrum of product (B) (KBr-disk, δ-values in cm.⁻¹):

| | |
|---|---|
| NH | 3310 |
| C=O β-lactam | 1750 |
| C=O carboxyl | 1730 |
| C=O ureido | 1650 |

Partial analysis of PMR spectrum of product (B) dissolved in hexadeutero-dimethylsulphoxide (60 mc.; δ values in p.p.m., internal reference: tetramethylsilane).

| | |
|---|---|
| CH₃ | 2.04. |
| S—CH₂ | About 3.18, about 3.49, about 3.56, about 3.86 (AB-quadruplet, J≈18.0 ±0.5 cps.). |
| C₆—H | 5.05; 5.13 (doublet, J'=4.7 ±0.3 cps.). |
| C₇—H | About 5.52; about 5.60; about 5.68; about 5.76 (quadruplet J'=4.7 ±0.3 cps., J'≅9.4 ±0.3 cps.). |
| NH | About 7.04; about 7.20 (doublet, J'≈0.3 cps.). |

Product (B) could also be prepared by addition of a silyl ester of 7-amino-desacetoxycephalosporanic acid to a silyl ester of 7-isocyanatodesacetoxycephalosporanic acid. An elemental analysis of product (B) showed the presence of two sulphur atoms per molecule, while the weight ratio of S and N was found to be 1.14. The presence of two desacetoxycephalosporanic acid parts per molecule was apparent also from intensity measurements of PMR absortions of a solution of a weighed amount of product (B) in dimethylsulphoxide containing a weighed amount of methyl benzoate as reference.

Various modifications of the compositions and method of the invention may be made without departing from the spirit or scope thereof and it is to be understood that the invention is intended to be limited only as defined in the appended claims.

I claim:

1. A compound selected from the group consisting of 7-isocyanatocephalosporanic acid derivatives of the formula

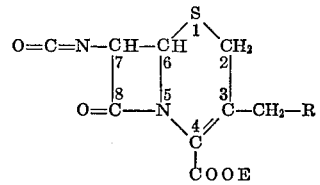

wherein R is selected from the group consisting of hydrogen, (R₁)₃SiO wherein R₁ is selected from the group consisting of lower alkyl, phenyl and phenyl lower alkyl and acetoxy and E is selected from the group consisting of a silyl, halosubstituted phenacyl, benzyl and and benzhydryl and the lactone of 7-isocyanato-(desacetyl-) cephalosporanic acid of the formula

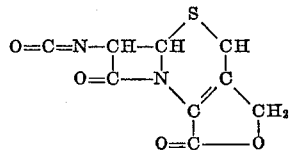

2. A compound of claim 1 which is the trimethylsilyl ester of 7-isocyanato-cephalosporanic acid.

3. A compound of claim 1 which is the trimethylsilyl ester of 7-isocyanato-desacetoxy-cephalosporanic acid.

4. A process for the preparation of a compound of claim 1 comprising reacting at a temperature below −20° C. phosgene with a cephalosporanic acid derivatives having a formula selected from the group consisting of

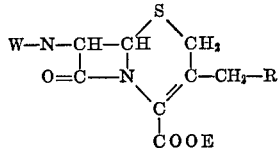

or

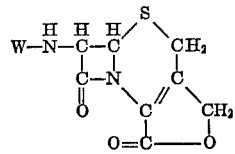

wherein W is selected from the group consisting of hydrogen and $(R_1)_3Si$ wherein $R_1$ is a hydrocarbon selected from the group lower alkyl, phenyl and phenyl lower alkyl in an anhydrous inert organic solvent.

5. The process of claim 4 wherein the reaction is carried out at temperatures $<-40°$ C.

6. The process of claim 4 wherein the reaction is carried out in the presence of an acid-binding agent.

7. The process of claim 4 wherein an excess of phosgene is used.

8. The process of claim 4 wherein $R_1$ is methyl.

References Cited
UNITED STATES PATENTS
3,573,296   3/1971   Johnson et al. ____ 260—243 C NICHOLAS S. RIZZO, Primary Examiner U.S. Cl. X.R.
424—246